June 1, 1926.

G. A. MONTGOMERY

FISHING TOOL

Filed Feb. 25, 1924

1,587,021

Inventor,
Gustavus A. Montgomery,
by Geyer & Geyer
Attorneys.

Patented June 1, 1926.

1,587,021

UNITED STATES PATENT OFFICE.

GUSTAVUS A. MONTGOMERY, OF TITUSVILLE, PENNSYLVANIA, ASSIGNOR TO TITUSVILLE FORGE COMPANY, OF TITUSVILLE, PENNSYLVANIA, A CORPORATION OF MARYLAND.

FISHING TOOL.

Application filed February 25, 1924. Serial No. 694,853.

The invention relates generally to improvements in fishing tools employed in well drilling operations but more particularly to a tool which is intended for use in connection with spiral stem drills.

Its chief object is to provide a tool of this character which is designed to uniformly grip and reliably take hold of the drill stem flanges or wings regardless of any unevenness thereof.

Another object of the invention is to provide the tool with novel gripping members or slits which are strong and durable in construction, and which are so mounted that they are readily accessible for insertion and removal when desired.

In the accompanying drawings:—

Figure 1:
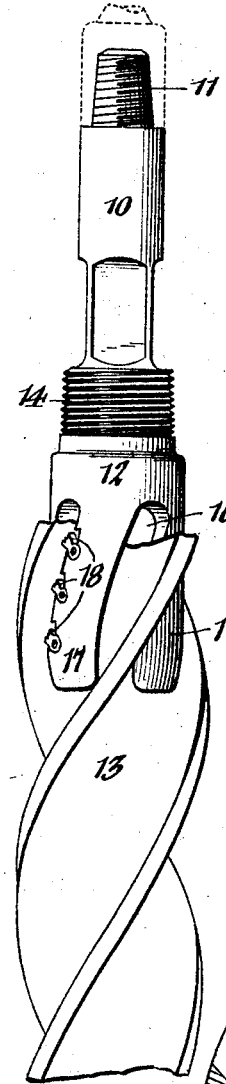
Figure 2:
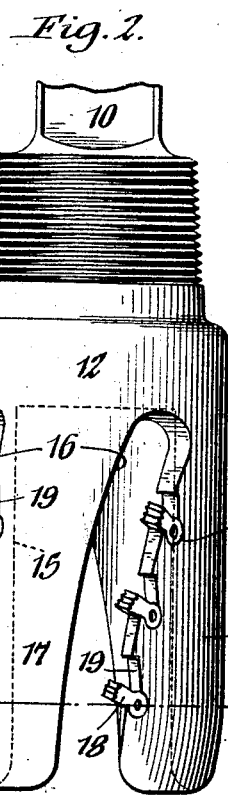
Figure 3:
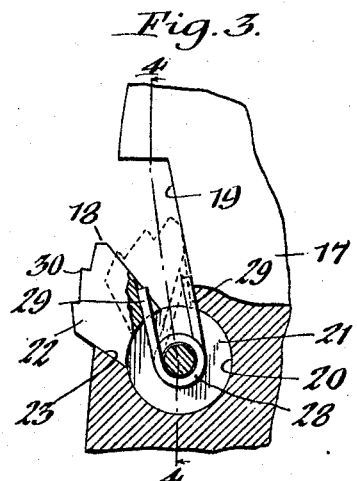
Figure 4:
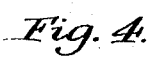
Figure 5:
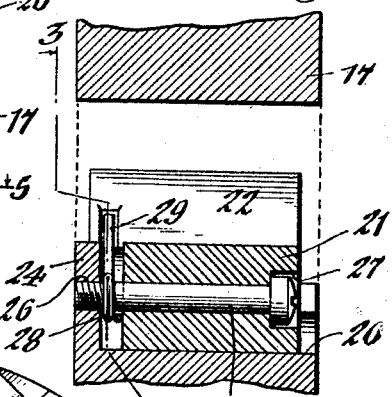
Figure 5:
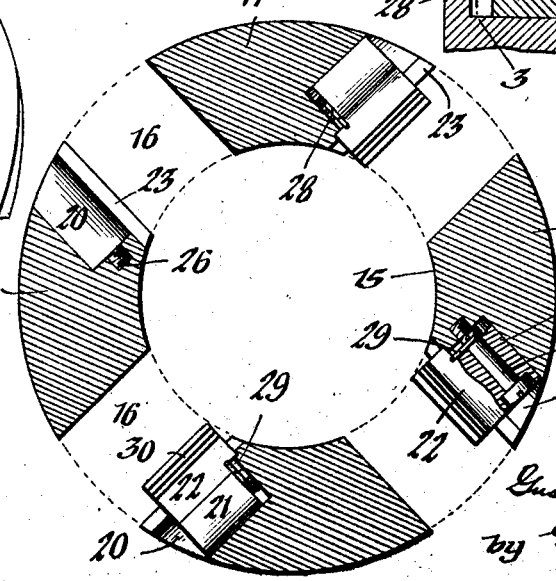

Figure 1 is a side elevation of the improved tool showing the same engaged with a broken spiral stem. Figure 2 is an enlarged fragmentary side view of the tool. Figure 3 is an enlarged fragmentary vertical longitudinal section on line 3—3, Fig. 4. Figure 4 is a transverse vertical section on line 4—4, Fig 3. Figure 5 is an enlarged horizontal section on line 5—5, Fig. 2.

Similar characters of reference indicate corresponding parts throughout the several views.

In the embodiment of the invention shown in the drawings, the tool comprises a shank portion 10 provided at its upper end with a tapered pin 11 for connecting it with the fishing string (not shown), while its lower end terminates in a cylindrical body portion 12 which is constructed for engagement with a spiral stem 13 or other "fish" which it is desired to withdraw from the well-bore. That portion of the tool-shank immediately above the fish-socket is preferably provided with an externally threaded portion 14 to which may be attached a string of pipe (not shown) which is sometimes employed for assisting in the pulling of the fish out of the well.

The body portion 12 of the tool is provided with a downwardly-opening circular bore or socket 15 for receiving the cylindrical-body of the spiral stem and a plurality of substantially vertical slots or openings 16 disposed radially of said body portion and forming a like number of intervening depending tongues 17. These slots are open at their lower ends for receiving the wings or flanges of the stem 13 and they are of partially helical form to correspond to the spiral formation of such wings or flanges.

Supported on the tongues 17 along one of the edges of the slots 16 and normally extending partway into the same, are a series of gripping members or slips 18 between which and the opposing slot walls the spiral stem is adapted to be reliably grasped. The preferred means of mounting these gripping members is shown in Figs. 2, 3, 4 and 5, and constructed as follows:

In one of the opposing walls of each slot 16 and disposed at suitable intervals lengthwise thereof, are a series of recesses 19 which terminate at their lower ends in substantially cylindrical transverse bearing-openings 20. Mounted in each recess to swing vertically into and out of the respective wing-receiving slot 16 is a gripping member which is provided at its inner end with a hub 21 from which projects a radial toothed portion 22. This gripping member is adapted to rock or swing on its hub to bring its toothed portion into the slot 16 or to retract it into the recess 19, the movement in the first-named direction being limited by a stop shoulder 23 and in the reverse direction by the rear wall of said recess. As shown in Fig. 4, the bearing opening 20 is only drilled partway through the respective tongue 17 to leave a wall 24 at its inner end. To hold the gripping member against displacement lengthwise of its bearing-opening, the same is applied to a pivot pin or bolt 25 whose inner end is threaded into an opening 26 in the end wall 24 of said bearing-opening, while its outer or headed end is seated in a counterbored opening 27 formed in the corresponding end of the gripping member hub 21.

As shown in Fig. 4, the inner end of the hub 21 terminates short of the opposing side of the end wall 24 and coiled about the pivot pin in the space between these parts is a coil spring 28 having arms 29 bearing against the rear wall of the recess 19 and the opposing face of the toothed portion 22 of the gripping member. This spring tends constantly to hold the gripping member in its open or operative position shown by full lines in Fig. 3, in which position the underside of the gripping member abuts against the stop shoulder 23. In the closed position of the gripping member shown by dotted lines in Fig. 4, the same lies wholly within the recess, so as not to interfere with the ready withdrawal of the spiral stem from the socket after the same has been removed from the well.

In the drawings, three gripping members are shown in connection with each slot, but it is to be understood that any number may be employed depending on the size and the use to which the tool is put.

In order to produce the best results, the teeth 30 of each gripping member are preferably arranged on a pitch line which is eccentric to the fulcrum of the gripping member. By this construction, the teeth produce an extended solid and positive grip on the spiral stem flanges, preventing slippage of the stem from the tool regardless of any unevenness which might be present on the faces of such flanges.

Briefly stated, the operation of this improved tool is as follows:

The tapered attaching pin 11 is connected to the fishing string in the usual manner and then the tool is lowered into the well until it reaches the broken spiral stem 13 or similar object which it is desired to withdraw from the well. The tool is now raised and lowered a sufficient number of times to cause the gripping members 8 to firmly grip the spiral wings of the stem in the slots 16 of the tool. The latter is now raised, elevating the spiral stem with it, to the top of the well. The removal of the stem from the tool is then effected by releasing the gripping members from engagement therewith and withdrawing said stem from the tool socket.

While I have shown and described the preferred embodiment of my invention, it will be apparent that various changes in the details of construction and arrangement of parts may be made without departing from its spirit.

I claim as my invention:—

1. A fishing tool of the character described, comprising a body having a bore and openings in its sides communicating therewith, one of the opposing walls of each opening having a recess therein, a transverse pivot pin arranged in said recess, and a gripping member fulcrumed on said pin for swinging into and out of said opening.

2. A fishing tool of the character described, comprising a body having a bore and openings in its sides communicating therewith, one of the opposing walls of each opening having a recess therein, a transverse pivot pin arranged in said recess, a gripping member mounted on said pin for swinging into and out of said opening, and a spring applied to said pivot pin for resisting movement of the gripping member out of its projected operating position.

3. A fishing tool of the character described, comprising a body having a bore and openings in its side communicating therewith, one of the opposing walls of each opening having a recess terminating at one end in a cylindrical bearing portion, a gripping member journaled in said bearing-portion with its gripping face normally projecting into said opening, and means for preventing displacement of the gripping member lengthwise of said bearing-portion.

4. A fishing tool of the character described, comprising a body having a bore and openings in its side communicating therewith, one of the opposing walls of each opening having a recess terminating at one end in a cylindrical bearing-portion, one end of the latter being closed and the other end open, a gripping member journaled in said bearing-portion with its gripping face normally projecting into said opening, and a retaining element applied to the gripping member and connected to the closed end of said bearing-portion for preventing longitudinal displacement of said gripping member.

5. A fishing tool of the character described, comprising a body having a bore and openings in its side communicating therewith, one of the opposing walls of each opening having a recess terminating at one end in a cylindrical bearing-portion, and a gripping member having a hub engaging the bearing-portion of said recess and a toothed portion arranged to normally project into said opening.

6. A fishing tool of the character described, comprising a body having a bore and openings in its side communicating therewith, one of the opposing walls of each opening having a recess terminating at one end in a cylindrical bearing-portion, one end of the latter being closed and the other end open, a gripping member having a hub engaging the bearing portion of said recess, and the inner end of said hub being spaced from the opposing closed end of said bearing-portion, and a coil spring arranged in such space and engaging said gripping member for resisting movement thereof in one direction.

7. A fishing tool of the character described, comprising a body having a downwardly opening bore and substantially spiral openings in its side communicating with said bore and extending to the lower end thereof, one of the opposing walls of each opening having a recess therein terminating at its lower end in a substantially cylindrical bearing portion, a vertically-swinging gripping member having a hub engaging the cylindrical bearing portion of said recess and a toothed portion extending radially from said hub, and means for removably retaining said gripping member in its bearing portion and for preventing endwise displacement thereof.

8. A fishing tool of the character described, comprising a body having a downwardly opening bore and substantially spiral openings in its side communicating with said bore and extending to the lower end thereof, one of the opposing walls of each opening having a recess therein terminating at its lower end in a substantially cylindrical bearing portion open at one end and closed at the other, a vertically-swinging gripping member including a hub engaging the cylindrical bearing portion of said recess and terminating short of the closed end thereof, a retaining screw extending axially through the hub of said gripping member and engaging the closed end of said bearing portion, and a coil spring applied to said screw in the space between the hub and the closed end wall of said bearing-portion, said spring having arms engaging the rear wall of the recess and the opposing side of said gripping member.

GUSTAVUS A. MONTGOMERY.